LEVI DODGE.
Improvement in Hay, Straw, and other Bales.
No. 125,031. Patented March 26, 1872.
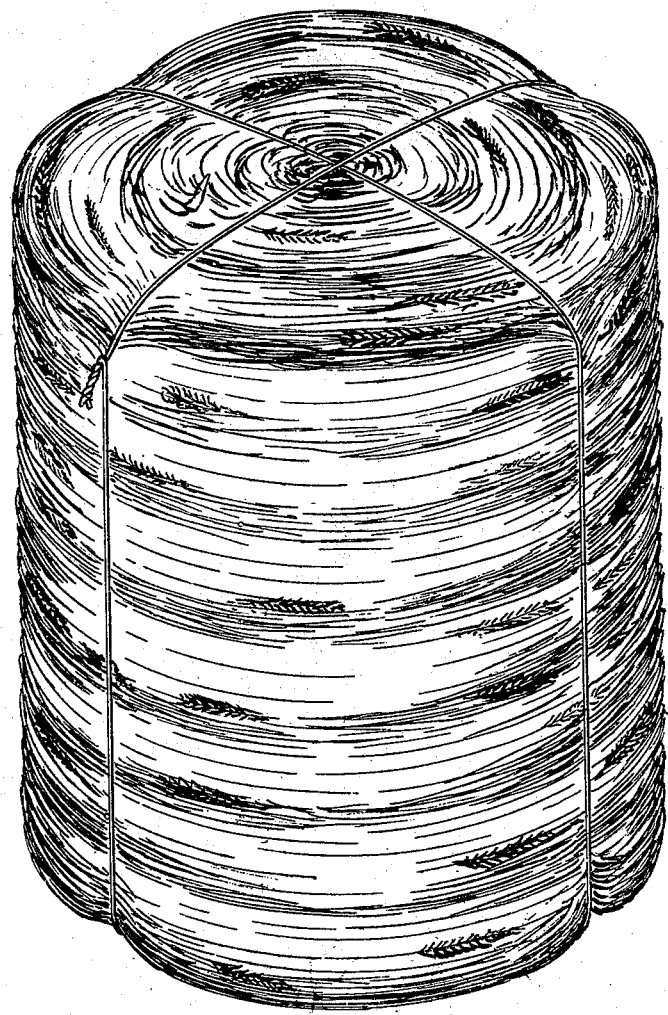
Witnesses
C. B. Nottingham
J. R. Nottingham
Inventor.
Levi Dodge
by atty A. Pollok

: 125,031

UNITED STATES PATENT OFFICE.

LEVI DODGE, OF WATERFORD, NEW YORK.

IMPROVEMENT IN HAY, STRAW, AND OTHER BALES.

Specification forming part of Letters Patent No. 125,031, dated March 26, 1872.

*To whom it may concern:*

Be it known that I, LEVI DODGE, of Waterford, county of Saratoga and State of New York, have invented certain new and useful Improvements in Bales composed of Hay, Straw, or similar substances, of which the following is a specification:

My invention consists of a bale composed of straw, hay, or similar substances built up endwise in layers, substantially as hereinafter described.

In Letters Patent of the United States No. 120,048, granted to me on the 17th October, 1871, I have described a baling-press which is well adapted to build up a bale in accordance with my invention; and to this patent I refer as indicating one mode in which my invention may be carried into effect.

The accompanying drawing represents a bale made in accordance with my invention, and by means of a press such as above referred to.

In said patented apparatus the hay or other material is, by means of a series of rollers having a rotary movement upon the axis of the bale-forming cylinder, progressively fed and compressed into the said cylinder, and laid in successive layers one above the other until the bale is thus built up and completed.

A bale thus made will occupy but little space, and can be more conveniently taken apart than ordinary bales. When the wires or bands are removed each layer of the material may be taken off separately without being entangled with the layer below. Another feature is that there is little or no opportunity of putting poor hay and chaff in the center of the bale, as is often done in bales made in the usual way—that is, when all the material of the bale is put in a box and compressed all at once. Again, the hay or straw is not broken so much as it is when stamped or pressed in a box, the tendency being to draw and press the stalks or "spears" lengthwise instead of breaking them, as is the case when the material is thrown into the box with the stalks or spears standing in all directions, and compressed and crushed without being drawn out and arranged flat or lengthwise.

What I claim as my invention, and desire to secure by Letters Patent, is—

As a new article of manufacture, a bale of hay, straw, or similar substance, made substantially as herein shown and described.

In testimony whereof I have signed my name to this specification before two subscribing witnesses.

LEVI DODGE.

Witnesses:
  C. N. NIVER,
  P. QUACKENBUSH.